(12) United States Patent
Waterson

(10) Patent No.: US 6,443,176 B1
(45) Date of Patent: Sep. 3, 2002

(54) FLUSH VALVE WITH ROTATABLE GRATE

(75) Inventor: Arlon Waterson, Hilmar, CA (US)

(73) Assignee: Hilmar Lumber, Inc., Hilmar, CA (US)

( * ) Notice: Subject to any disclaimer, the term of this patent is extended or adjusted under 35 U.S.C. 154(b) by 0 days.

(21) Appl. No.: 09/707,717

(22) Filed: Nov. 6, 2000

Related U.S. Application Data

(60) Provisional application No. 60/168,226, filed on Nov. 30, 1999.

(51) Int. Cl.$^7$ .............................................. F16K 51/00
(52) U.S. Cl. ..................... 137/15.05; 137/240; 251/120; 251/121
(58) Field of Search .................... 251/208, 118, 251/120, 121; 137/15.04, 15.05, 237, 238, 240; 454/358

(56) References Cited

U.S. PATENT DOCUMENTS

| | | | |
|---|---|---|---|
| 1,776,455 A | 9/1930 | Thompson | |
| 3,033,467 A | 5/1962 | Hofer | |
| 3,258,205 A | 6/1966 | Hruby, Jr. | |
| 3,408,006 A | 10/1968 | Stanwood | |
| 3,770,203 A | 11/1973 | Dyar | |
| 4,358,057 A | 11/1982 | Burke | |
| 5,181,658 A | 1/1993 | Behar | |
| 5,575,020 A | * 11/1996 | Hubrig et al. | 4/342 |
| 5,938,525 A | * 8/1999 | Birdsong et al. | 454/290 |
| 6,206,021 B1 | * 3/2001 | Hartman et al. | 251/121 X |
| 6,231,438 B1 | * 5/2001 | Laudermilk | 454/290 |

FOREIGN PATENT DOCUMENTS

EP 461295 6/1990

* cited by examiner

*Primary Examiner*—Kevin Lee
(74) *Attorney, Agent, or Firm*—Townsend and Townsend and Crew LLP; Craig P. Wong

(57) ABSTRACT

A flush valve (2) includes a body (4) having a remotely actuated element (14) between an inlet (22) and an outlet (24) of the valve. A rotatable grate (8) having angled vanes (10) is positioned at the outlet whereby the direction of fluid flow can be selected. The grate is preferably manually rotatable to provide manual selection pf the direction of fluid flow.

13 Claims, 2 Drawing Sheets

FLUSH VALVE WITH ROTATABLE GRATE

This application claims the benefit of Provisional Patent Application No. 60/168,226 filed Nov. 30, 1999.

BACKGROUND OF THE INVENTION

Cleanliness is very important in the production of food. This is especially true in the dairy industry in which floors are periodically flushed with water and cleaning solutions to maintain appropriately sanitary conditions. One way to do so is by pumping the cleaning liquid up through an opening in the floor at strategically located positions to wash down the floor. The flow of the cleaning liquid through individual openings is often accomplished by the use of dairy flush valves adjacent to each opening. A flush valve is commonly mounted to the upper end of a Tee extending from a supply line. One conventional valve uses an inflatable bladder which when inflated seals the opening and prevents fluid flow. Deflating the bladder permits water pressure from the supply line to push open a valve to permit fluid flow to pivot a pop-up lid, which is normally flush with the top surface of the floor, upwardly to an open position to permit the cleaning liquid to flow on to the floor. Another conventional version does not use a pop up lid, but rather uses a fixed grate with upwardly extending vanes flush with the floor surface.

SUMMARY OF THE INVENTION

The present invention is directed to a flush valve of the type including a body having a remotely actuated valve element between an inlet and an outlet of the valve. A rotatable grate having angled vanes is positioned at the outlet whereby the direction of fluid flow can be selected. The grate is preferably manually rotatable to provide manual selection of the direction of fluid flow.

Another aspect of the invention is directed to a method for flushing at least a portion of a surface with a cleaning liquid. According to this method, a rotatable grate of a flush valve is oriented to a desired angular orientation according to a desired cleaning path, the grate having vertically angled vanes. The flush valve is opened to allow fluid passage through the rotatable grate and cleaning liquid flows through the flush valve and between the angled vanes so the cleaning liquid flows along the desired cleaning path.

An advantage of the invention is that it permits the flow of a cleaning liquid over a surface to be directed by a user rather than simply having cleaning liquid flow upwardly out of a grate valve. The cleaning liquid can be provided a desired flow direction along a cleaning path. This eliminates the need to rely solely on the slope of the surface as to the direction and speed at which the cleaning liquid flows.

Other features and advantages of the invention will appear from the following description in which the preferred embodiment has been set forth in detail in conjunction with the accompanying drawings.

DESCRIPTION OF THE PREFERRED EMBODIMENT

Figure 1:
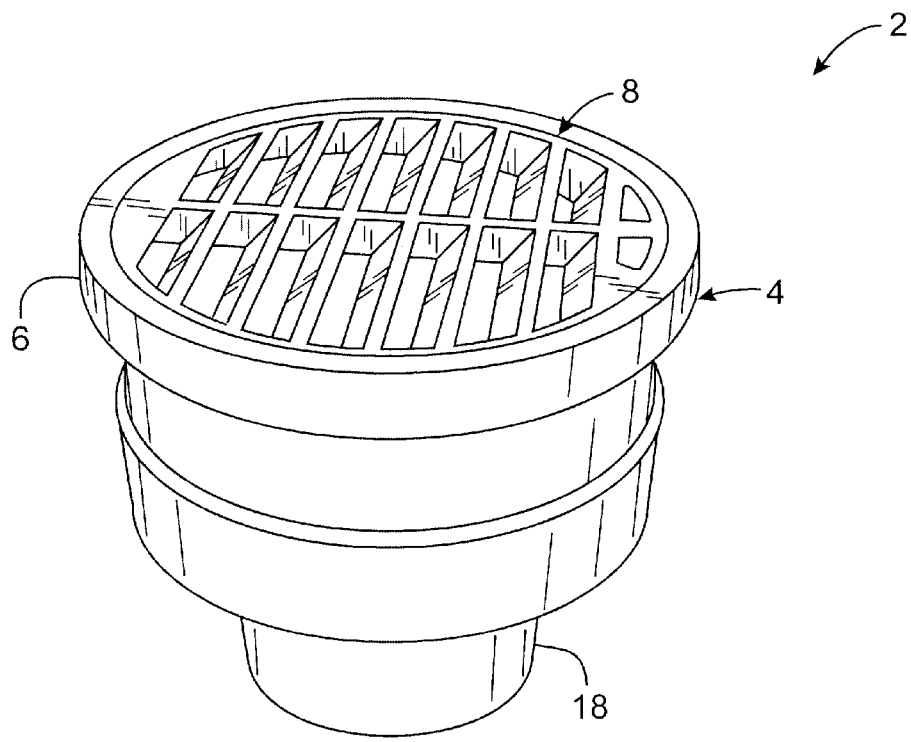
FIG. 1 is an overall view of a grated flush valve made according to the invention.

FIG. 1 illustrates a grated flush valve 2 made according to the invention. Valve includes a main body 4 having an upper rim 6 within which a flow directing grate 8 is rotatably mounted. Grate 8 includes a series of parallel, straight vanes 10 oriented at an acute angle to a vertical, typically about 45 degrees. Other angles, typically between about 30° and 60°, could also be used. The angular orientation of grate 8 may be changed manually by the user grasping and rotating the grate. Valve 2 may be made to permit grate 8 to be rotated by, for example, a remotely-operated pneumatic actuator. If desired, grate 8 may be secured in a chosen orientation by using, for example, set screws, clips, adhesive, detent mechanisms or friction.

Figure 2:
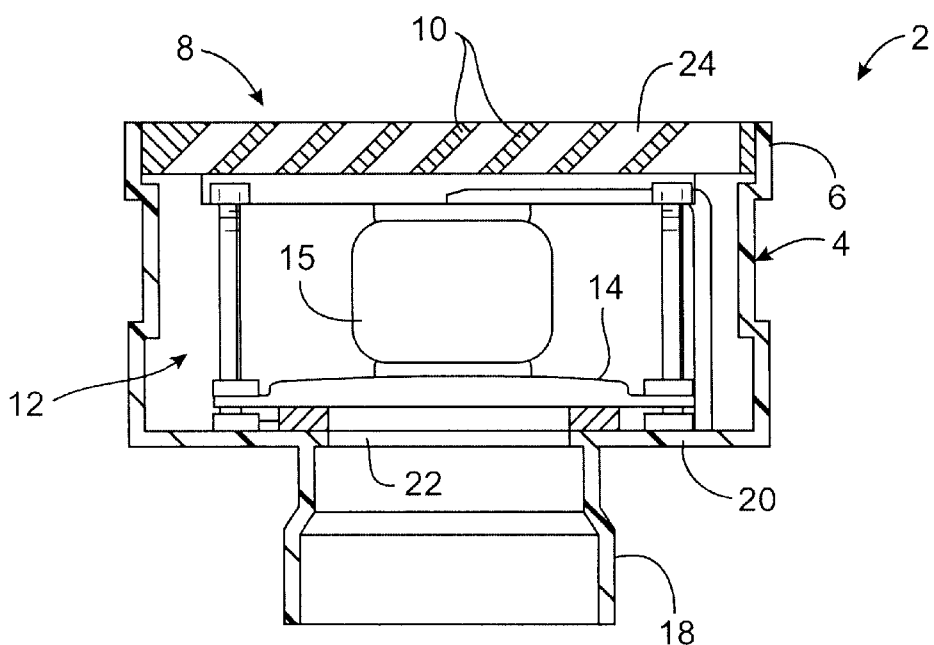
FIGS. 2 and 3 are simplified side cross-sectional views of the valve of FIG. 1 showing the valve in closed and open conditions, respectively.
Figure 3:
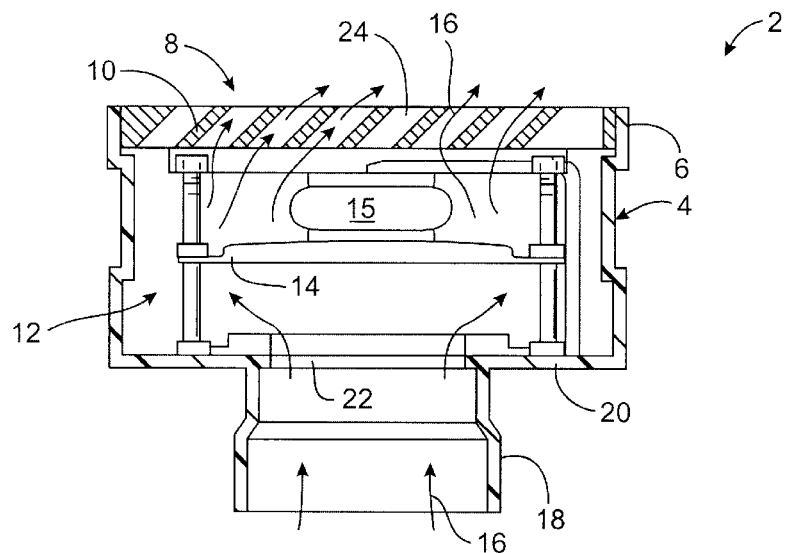
Figure 4:
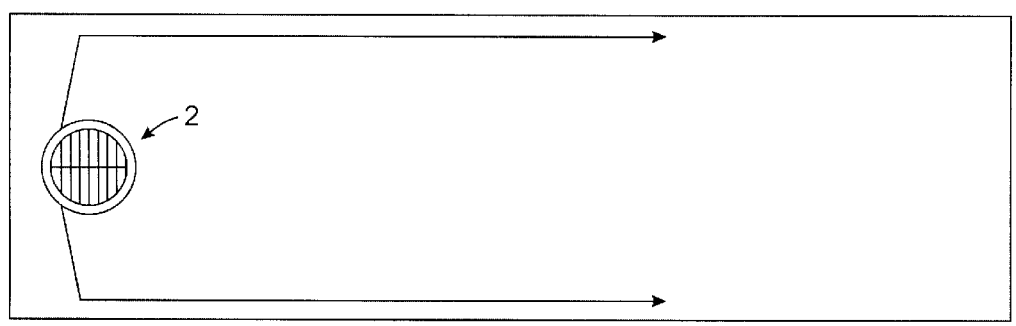
FIG. 4 is a plan view illustrating the valve of FIG. 1 with the rotatable grate oriented flush with a surface to be cleaned, with arrows indicating the general flushed area of the surface.

A conventional pneumatic valve 12 is mounted within the interior of main body 4 and includes a movable sealing member 14 mounted to an inflatable bladder 15 which, when inflated, typically with compressed air, assumes the condition of FIG. 2. When the pressurized fluid source is removed, bladder 15 naturally collapses to the open condition of FIG. 3. As indicated in FIG. 3, cleaning liquid 16 flows upwardly through a collar 18, which extends from the bottom 20 of main body 4, through the inlet 22 of valve 2, past and around sealing member 14, and between vanes 10 of grate 8 at the outlet 24 of valve 2. FIG. 4 illustrates a typical surface 26 to be flushed by cleaning liquid 16. Surface 26 typically has an incline or fall of about 5 inches per 100 feet when surface 26 is a portion of the floor of a dairy barn. Other inclines or falls may be appropriate depending upon the flow rate of cleaning liquid, type of surface, matter to be removed, etc. It is also preferred that the side fall, that is the slope of surface 26 perpendicular to the direction of flow of cleaning liquid 16, be minimal so to help ensure cleaning liquid 16 spreads evenly over surface 26.

Main body 4 is typically made of PVC, although steel or fiberglass can also be used. Grate 8 is preferably made of aluminum while plastic or steel may be used as well. Collar 18 is typically PVC.

Modification and variation can be made to the disclosed embodiment without departing from the subject of the invention as defined in the following claims. For example, although a pneumatic valve is illustrated, other types of valves, such as water and oil, could also be used. While vanes 10 are, in the preferred embodiment, straight and parallel, the vanes could be curved, not parallel, or both curved and not parallel. Also, the vanes need not all be oriented at an angle to the vertical or at the same angle to the vertical.

Any and all patents, patent applications and printed publications referred to above are incorporated by reference.

What is claimed is:

1. A flush valve including a body having a remotely actuated valve element between an inlet and an outlet, the improvement comprising:

a rotatable grate having angled vanes at the outlet whereby the direction of fluid flow can be selected.

2. The flush valve according to claim 1, wherein said grate is a manually rotatable grate to provide manual selection of the direction of fluid flow.

3. The flush valve according to claim 1, wherein said angled vanes of said rotatable grate are straight.

4. The flush valve according to claim 1, wherein said angled vanes of said rotatable grate are parallel to one another.

5. A method for flushing at least a portion of a surface with a cleaning liquid comprising:

(a) orienting a rotatable grate of a flush valve to a desired angular orientation, according to a desired cleaning path, said grate having vanes oriented at an angle to vertical;

(b) opening said flush valve to allow fluid passage through said rotatable grate; and (c) flowing a cleaning liquid through said flush valve and between said angled vanes so said liquid flows along a said desired cleaning path.

6. The method according to claim 5, wherein the orienting step comprises manually rotating said grate to said desired angular orientation.

7. The method according to claim 5, further comprising selecting a rotatable grate having straight angled vanes.

8. The method according to claim 5, further comprising selecting a rotatable grate having parallel vanes.

9. The method of claim 8 wherein the parallel vanes are oriented at an angle between approximately 30° degrees and 60° degrees relative to vertical.

10. A flush valve comprising:

a body having a remotely actuated valve element between an inlet and an outlet; and rotatable grate means comprising a plurality of angled vanes at the outlet for selectively directing fluid flow.

11. The flush valve of claim 10 wherein the rotatable grate means are manually rotatable.

12. The flush valve according to claim 10, wherein said angled vane of said rotatable grate are straight.

13. The flush valve according to claim 10, wherein said angled vanes of said rotatable grate are parallel to one another.

\* \* \* \* \*